A. J. FULGHUM.
BLACKSMITH'S TOOL.
APPLICATION FILED SEPT. 6, 1912.
1,073,802.  Patented Sept. 23, 1913.
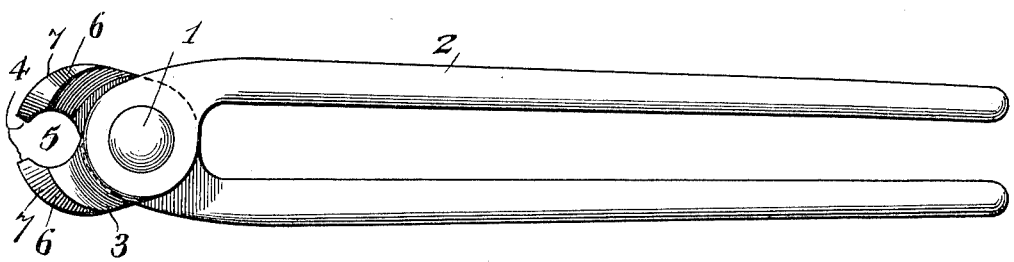
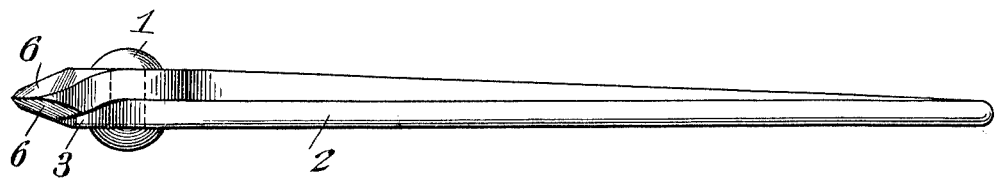
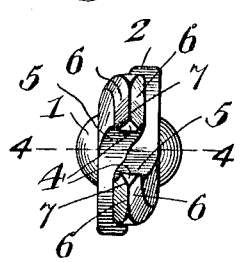
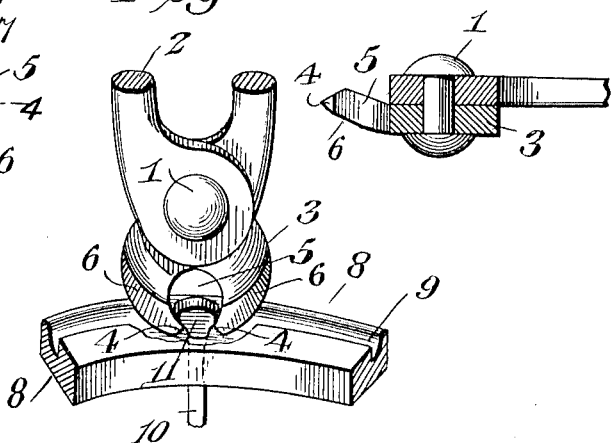
Albert J. Fulghum, INVENTOR,
WITNESSES
Howard D. Orr
F. T. Chapman
BY
E. G. Siggers
ATTORNEY

UNITED STATES PATENT OFFICE.

ALBERT JEREMIAH FULGHUM, OF CHATTANOOGA, TENNESSEE.

BLACKSMITH'S TOOL.

1,073,802.   Specification of Letters Patent.   Patented Sept. 23, 1913.

Application filed September 6, 1912. Serial No. 718,940.

*To all whom it may concern:*

Be it known that I, ALBERT J. FULGHUM, a citizen of the United States, residing at Chattanooga, in the county of Hamilton and State of Tennessee, have invented a new and useful Blacksmith's Tool, of which the following is a specification.

This invention has reference to improvements in blacksmiths' tools, and is designed particularly for the pulling of driven horseshoe nails from the horseshoe without the necessity of removing the shoe from the hoof.

It sometimes happens in shoeing a horse that after a nail has been driven until the head of the nail is seated in the groove of the shoe provided for its reception, it is found that the nail is improperly driven and must be withdrawn. So far as I am aware, there is at the present time no tool on the market by which such a driven nail may be withdrawn by itself, but it is necessary in order to extract the improperly driven nail to remove the entire shoe from the hoof, together with such nails as had been previously driven, thus destroying the usefulness of all the nails.

With the present invention any nail in the shoe may be withdrawn without disturbing the others, so that the only nail rendered useless for further driving is the one improperly driven nail afterward extracted. Of course, when the nail is only partly driven in it may be taken out with the ordinary blacksmith's pliers, but these pliers are useless after the head of the nail has once seated in the groove provided for the purpose. This groove is usually flat on the inner side and tapered on the outer side, and horseshoe nails are similarly formed, so far as the head is concerned. The heads of horseshoe nails also usually expand in the direction of the length of the seat in the horseshoe.

The present invention contemplates a pair of pliers with short noses and long handles with the noses beveled laterally, so as to enter the seat or groove in the horseshoe and these noses are also curved one toward the other, so as to grip and underride the head of the horseshoe nail when fully seated in the groove, and when the nail is gripped by the pliers it may be readily extracted without disturbing any other driven nails. The nose portions of the pliers are beveled from opposite sides, so that no matter how the pliers are grasped by the operator they will enter the nail seating groove, since either side of the noses of the pliers will conform to the beveled or slanting side of the groove.

The invention will be best understood from a consideration of the following detailed description, taken in connection with the accompanying drawings forming a part of this specification, with the further understanding that while the drawings show a practical form of the invention, the latter is susceptible of other practical embodiments, wherefore the invention is not confined to any exact conformity with the showing of the drawings, but may be changed and modified so long as such changes and modifications mark no material departure from the salient features of the invention.

In the drawings: Figure 1 is a plan view of a blacksmith's tool constructed in accordance with the present invention. Fig. 2 is an edge view thereof. Fig. 3 is an end view thereof. Fig. 4 is a section on the line 4—4 of Fig. 3. Fig. 5 is a perspective view of the gripping end of the tool, showing its application to a nail in a horseshoe, a small portion of the horseshoe being shown in the figure.

The blacksmith's tool is in the form of a pair of pliers comprising two like members joined by a pivot pin 1 and each comprising a handle portion 2 and a nose 3, the parts being suitably bent to be brought into matching relation as is customary in pliers.

Because of the use to which the tool is put, it is customary to make the handle portion 2 quite long with respect to the nose portion 3. Each nose portion 3 is formed with a beak 4 curved toward the like part of the other, so that when the two beaks 4 are brought into appropriately close relation one to the other, there is provided an expanded opening 5 between the beaks and the pivot 1. Moreover, the nose portions 3 are laterally widened and then beveled from opposite sides, as indicated at 6, until the exterior edges of the beaks 4 are comparatively sharp, as indicated at 7.

A horseshoe as usually constructed and indicated at 8 in Fig. 5, is provided along the nail receiving portion with a groove 9 having the outer wall slanting toward the inner wall and the latter being comparatively straight, that is, nearly or quite perpendicular to the tread of the shoe. Horseshoe nails, one of which is indicated at 10, have laterally expanded heads 11 which when the nail is driven through the horseshoe into the horse's hoof seat in the groove 9 flush with or slightly below the tread portion of the shoe. Sometimes several nails, or perhaps all but the last nail used in fastening the horseshoe to the horse's hoof may be driven into place, and for some reason it is found that the last nail, or perhaps after all the nails are driven, some other nail has been improperly driven and must be withdrawn. Under these conditions the tool of the present invention is particularly useful, in that it may be inserted in the groove 9 and about the head 11 of the nail into firm gripping relation thereto, the beaks 4 underriding the head of the nail from opposite sides with the expanded head in the expanded opening 5 and under these conditions the nail may be quite easily withdrawn from the hoof without injury to any of the other nails and often without material injury to the withdrawn nail. There is no tool upon the market capable of performing this act and hence the present tool avoids the necessity of removing the horseshoe in toto from the hoof because of a defectively driven nail, thereby saving labor, and it also avoids the spoiling of a number of nails in remedying a defect due to an improperly driven nail. Because of the double bevel 6, the grippers or pliers may be introduced into the groove 9 without the necessity of turning one side or the other of the pliers toward the bevel portion of the groove as might occur were the noses of the pliers made to conform to the shape of the groove, that is, with one edge beveled and the other edge straight. The beaks 4 are blunt and tempered so as to wear well, for if they were sharp or pointed they would wear away rapidly or if tempered to harden them against wear they would then break easily.

What is claimed is:—

1. A blacksmith's tool comprising two members pivoted together and each comprising a handle portion and a nose portion on opposite sides of the pivot, with the nose portion oppositely beveled to an approximately sharp outer edge shaped to enter the nail groove of a horseshoe, said nose portion being formed into a curved beak with the beveled portion extending to the extremity of the beak.

2. A blacksmith's tool comprising two members pivoted together and each comprising a handle portion and a nose portion, the latter terminating in a curved beak presented toward the corresponding portion of the companion part of the tool with the outer edge of the beak to the extremity thereof beveled to an approximately sharp edge to enter the nail groove of a horseshoe with the beaks in embracing relation to the head of a horseshoe nail lodged in the groove.

In testimony, that I claim the foregoing as my own, I have hereto affixed my signature in the presence of two witnesses.

ALBERT JEREMIAH FULGHUM.

Witnesses:
E. J. NOLAN,
A. C. BOURQUIN.

---

Copies of this patent may be obtained for five cents each, by addressing the "Commissioner of Patents, Washington, D. C."